United States Patent
Chung et al.

(10) Patent No.: US 7,777,829 B2
(45) Date of Patent: Aug. 17, 2010

(54) LIQUID CRYSTAL DISPLAY DEVICE

(75) Inventors: Jae-mo Chung, Suwon (KR); Jin-hee Sung, Suwon (KR); Jin-seok Jang, Suwon (KR)

(73) Assignee: Samsung Mobile Display Co., Ltd., Yongin-si (KR)

( * ) Notice: Subject to any disclaimer, the term of this patent is extended or adjusted under 35 U.S.C. 154(b) by 217 days.

(21) Appl. No.: 12/057,231

(22) Filed: Mar. 27, 2008

(65) Prior Publication Data
US 2008/0278653 A1 Nov. 13, 2008

(30) Foreign Application Priority Data
May 10, 2007 (KR) .................. 10-2007-0045556

(51) Int. Cl.
*G02F 1/1333* (2006.01)
(52) U.S. Cl. ................. 349/58; 349/56; 349/65
(58) Field of Classification Search .......... 349/58, 349/56, 65; 385/75, 88, 89
See application file for complete search history.

(56) References Cited

U.S. PATENT DOCUMENTS

| | | | |
|---|---|---|---|
| 2004/0037063 A1 | 2/2004 | Chino | |
| 2004/0065894 A1* | 4/2004 | Hashimoto et al. | 257/100 |
| 2005/0001952 A1* | 1/2005 | Han et al. | 349/65 |
| 2006/0092665 A1 | 5/2006 | Kim et al. | |
| 2006/0291240 A1* | 12/2006 | Kim et al. | 362/600 |
| 2007/0091242 A1 | 4/2007 | Oohira | |
| 2008/0067535 A1* | 3/2008 | Wu et al. | 257/98 |
| 2009/0033832 A1* | 2/2009 | Pai | 349/65 |

FOREIGN PATENT DOCUMENTS

| | | |
|---|---|---|
| JP | 2001-330830 | 11/2001 |
| JP | 2003-344851 A | 12/2003 |
| JP | 2005-135860 | 5/2005 |
| JP | 2005-326454 | 11/2005 |
| KR | 2002-0091794 | 12/2002 |
| KR | 10-2006-0046130 | 5/2006 |
| KR | 10-2006-0125548 A | 12/2006 |

(Continued)

OTHER PUBLICATIONS

Patent Abstracts of Japan, Publication 2005-326454, Published Nov. 24, 2005, for Kinoshita.

(Continued)

*Primary Examiner*—Ellen Kim
(74) *Attorney, Agent, or Firm*—Christie, Parker & Hale, LLP

(57) ABSTRACT

A liquid crystal display device includes a liquid crystal display panel for displaying images, a light guide plate adjacent the liquid crystal display panel for providing light supplied to an edge of the light guide plate to the liquid crystal display panel, and a bottom chassis having at least one slit thereon. A flexible printed circuit board on the light guide plate includes at least one housing within the at least one slit, the at least one housing supporting a light emitting diode for supplying light to the light guide plate. A thickness of a lower end of the housing on a first side of the light emitting diode varies from a thickness of an upper end of the housing on a second opposite side of the light emitting diode.

8 Claims, 5 Drawing Sheets

FOREIGN PATENT DOCUMENTS

KR    10-2007-0065079 A    6/2007

OTHER PUBLICATIONS

Korean Patent Abstracts, Publication 1020020091794 A, Published Dec. 6, 2002, for Aoyanagi, et al.

Korean Patent Abstracts, Publication 1020060046130 A, Published May 17, 2006, for Sakurai.

Patent Abstracts of Japan, Publication No. 2001-330830; Date of Publication: Nov. 30, 2001; in the name of Hisatoku Kawakami et al.

European Search Report dated Jul. 25, 2008, for corresponding European Application 08155946.0, indicating relevance of listed references in this IDS.

SIPO Office action dated Nov. 13, 2009, for corresponding Chinese application 200810097037.5, with English translation, noting listed reference in this IDS, as well as U.S. Publication 2006/0291240 previously filed in an IDS dated Aug. 30, 2008.

\* cited by examiner

LIQUID CRYSTAL DISPLAY DEVICE

CROSS-REFERENCE TO RELATED APPLICATION

This application claims priority to and the benefit of Korean Patent Application No. 10-2007-0045556, filed on May 10, 2007, in the Korean Intellectual Property Office, the entire content of which is incorporated herein by reference.

BACKGROUND

1. Field of the Invention

The present invention relates to a liquid crystal display device.

2. Discussion of Related Art

Recently, various flat plate displays of relatively reduced weight and volume have been developed to overcome certain disadvantages of cathode ray tubes (CRTs). Exemplary flat panel displays include liquid crystal displays (LCDs), field emission displays (FEDs), plasma display panels (PDPs), and organic light emitting displays.

Since liquid crystal display devices are relatively small, light weight, and have low power consumption, they have been targeted as substitutes for CRTs where applicable. Liquid crystal display devices have been used on relatively large products such as monitors and TVs as well as on portable devices such as portable phones and Personal Digital Assistants (PDAs).

Liquid crystal display devices applied to portable devices use at least one light emitting diode (LED) as a light source to express an image of a certain luminance. As shown in FIG. 1A, a conventional liquid crystal display device includes a light emitting diode substrate 2 and at least one housing 4 on the light emitting diode substrate 2. The light emitting diode substrate 2 is fixedly attached within a mold frame and supplies a control signal from a flexible printed circuit board (FPCB) to the housing 4. The housing 4 is attached to and electrically coupled to the light emitting diode substrate 2. As shown in FIG. 1B, the housing 4 includes an LED 6 fixed therein for generating light corresponding to a control signal provided from the housing 4. Including a light emitting diode substrate 2 in a conventional liquid crystal display panel results in an increase of manufacturing cost.

SUMMARY OF THE INVENTION

According to aspects of the present invention, a liquid crystal display device is provided that reduces manufacturing cost.

In an exemplary embodiment of the present invention, a liquid crystal display device is provided including a liquid crystal display panel for displaying images, the liquid crystal display panel having a first pad, a light guide plate adjacent the liquid crystal display panel for providing light supplied to an edge of the light guide plate to the liquid crystal display panel, and a bottom chassis having at least one slit formed thereon, the light side plate between the liquid crystal display panel and a first side of the bottom chassis. A flexible printed circuit board is located at a second side of the light guide plate and includes a second pad coupled to the first pad. At least one housing is located on the flexible printed circuit board, the at least one housing supporting a light emitting diode supplying light to the light guide plate, wherein the light emitting diode is positioned at the edge of the light guide plate through the at least one slit. The housing includes a first portion and a second portion on opposite sides of the light emitting diode, the first and second portions having different thicknesses from each other, and wherein the first portion is adjacent the flexible printed circuit board.

In one exemplary embodiment, the thickness of the first portion of the housing is greater than the thickness of the second portion of the housing. The thickness of the first portion and the thickness of the second portion of the housing are configured to position the light emitting diode at substantially a center of an edge of the light guide plate. Further, the light guide plate may be configured not to overlap the at least one slit.

In one exemplary embodiment, the flexible printed circuit board includes at least two housings, each housing within a separate slit. In another exemplary embodiment, each housing is within a single slit. Further, the at least one housing may be directly attached to the flexible printed circuit board.

In yet another exemplary embodiment, a light emitting diode housing is provided for a liquid crystal display device as described above. The light emitting diode housing includes a groove for containing a light emitting diode, an upper portion on a first side of the groove having a first thickness, and a lower portion on a second opposite side of the groove having a second thickness wherein the second thickness varies the first thickness, wherein the housing is attachable to the light guide plate.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
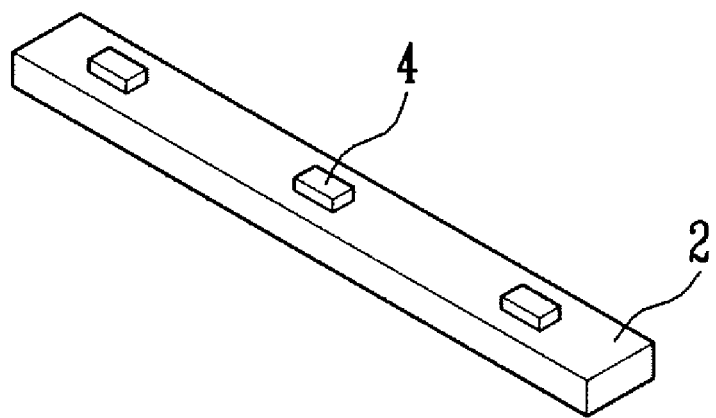
FIG. 1A and FIG. 1B are schematics showing a conventional light emitting diode substrate and housing.
Figure 1B:
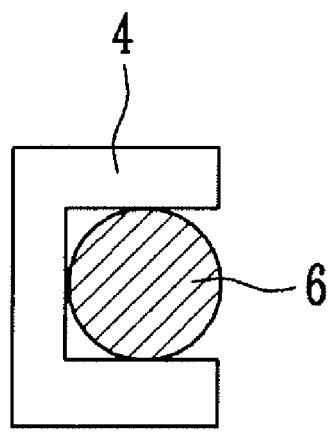

In the following detailed description, only certain exemplary embodiments of the present invention are shown and described, by way of illustration. Here, when a first element is described as being connected to a second element, the first element may be directly connected to the second element or may be indirectly connected to the second element via a third element. Further, some of the elements that are not essential to the complete understanding of the invention are omitted for clarity. As those skilled in the art will recognize, the invention may be embodied in many different forms and should not be construed as being limited to the embodiments set forth herein. Like reference numerals designate like elements throughout the specification.

Figure 2:
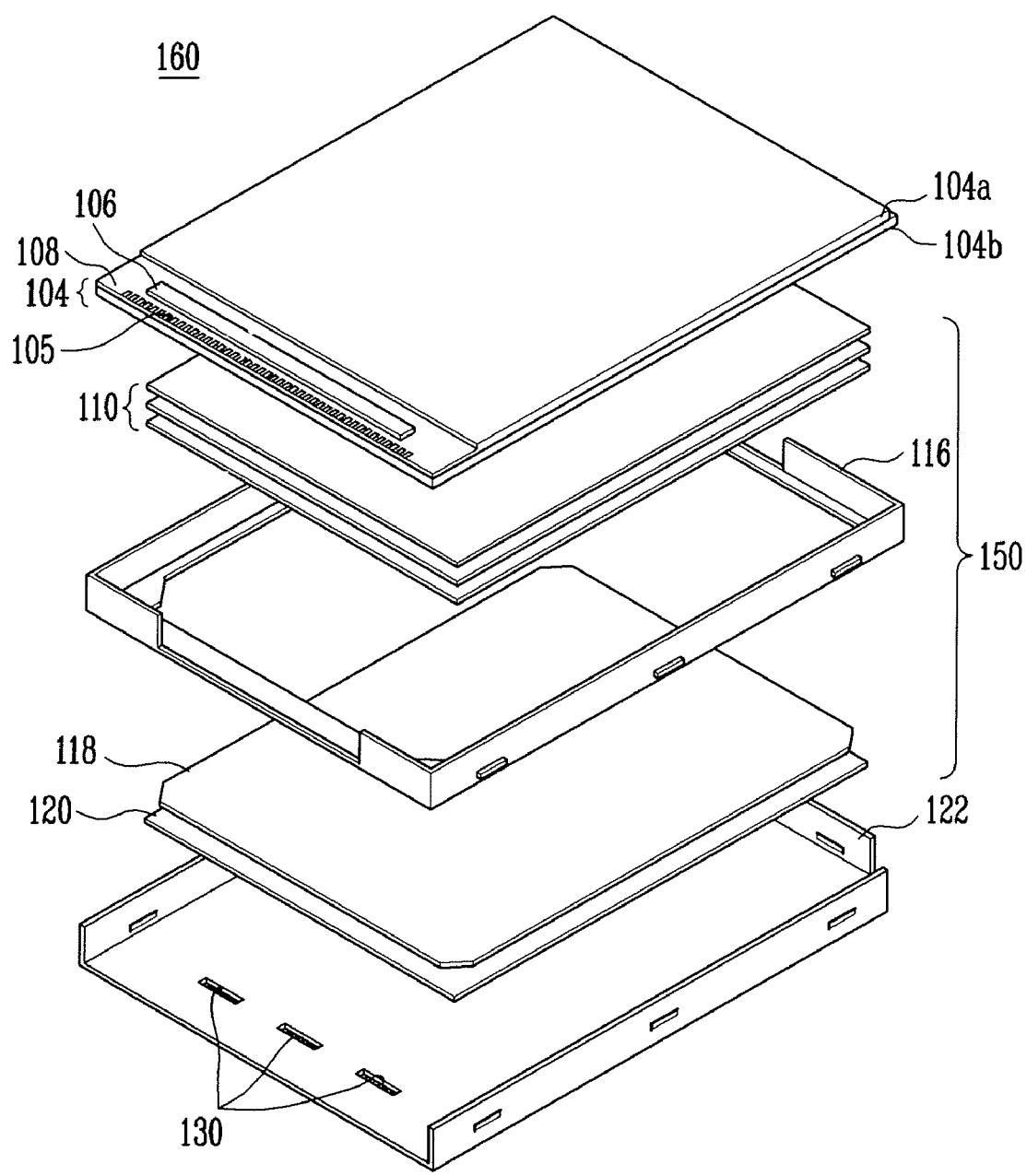
FIG. 2 is an exploded schematic diagram perspective showing a liquid crystal display device according to a first exemplary embodiment of the present invention.

FIG. 2 is a perspective view showing a liquid crystal display device according to a first embodiment of the present invention.

With reference to FIG. 2, a liquid crystal display device 160 according to a first exemplary embodiment of the present invention includes a liquid crystal display panel 104, a back light assembly 150, and a bottom chassis (or bezel) 122. The liquid crystal display panel 104 displays images and includes a first substrate 104a, a second substrate 104b, and liquid crystals injected between the first substrate 104a and the second substrate 104b.

The second substrate 104b includes a plurality of thin film transistors (TFTs) arranged in a matrix. A source electrode of the TFT is coupled with a data line, and a gate electrode of the TFT is coupled with a scan line. A drain electrode of the TFT is coupled with a pixel electrode composed of a transparent conductive material. When a scan signal is supplied to the scan line, the TFT is turned on to provide a data signal supplied to the data line to the pixel electrode.

An integrated circuit 106 is located on one side of the second substrate 104b, and provides the data signal and the scan signal, and a periphery of the integrated circuit 106 is coated with a passivation layer 108. First pads 105 are located at one end of the second substrate 104b. The first pads 105 receive a drive signal (e.g., predetermined drive signal) from an external device and provide the drive signal to the integrated circuit 106.

The first substrate 104a faces the second substrate 104b. An entire surface of the first substrate 104a is coated with a common electrode composed of a transparent material. When a suitable voltage (e.g. a predetermined voltage) is applied to the common electrode, an electric field is formed between the common electrode and the pixel electrode. The electric field changes alignment angle of a liquid crystal between the first substrate 104a and the second substrate 104b. Optical transmittance is changed to display desired images according to the changed alignment angle of the liquid crystal.

The backlight assembly 150 includes a mold frame 116, a light guide plate 118, a reflection plate 120, and optical sheets 110. The light guide plate 118 provides light supplied from LEDs to the liquid crystal display panel 104. Here, the LEDs are located on a side (e.g., an edge) of the light guide plate 118. Therefore, the light guide plate 118 provides light provided by the LEDs to its side toward the liquid crystal display panel 104.

The reflection plate 120 is located at a rear surface of the light guide plate 118, and reflects incident light back toward the light guide plate 118, thereby improving the light efficiency. The optical sheets 110 improve the luminance of light supplied from the light guide plate 118 to the liquid crystal display panel 104. The mold frame 116 fixes and supports the backlight assembly 150 and the liquid crystal display panel 104. The mold frame 116 has sufficient strength (e.g., predetermined strength) to protect the backlight assembly 150 and the liquid crystal display panel 104 from external impact or shock.

The bottom chassis 122 may be composed of aluminum and is fixed to enclose the mold frame 116. The bottom chassis 122 provides sufficient strength (e.g. predetermined strength) to the liquid crystal display device 160 to prevent or reduce the likelihood of distortion.

At least one slit (or slit hole) 130 is located on one end of a bottom surface (i.e., the surface that is parallel to the light guide plate 118) of the bottom chassis 122. A fixture including an LED is inserted into the slit 130, and therefore, in one exemplary embodiment, the light guide plate 118 does not overlap the slit 130.

Figure 3:
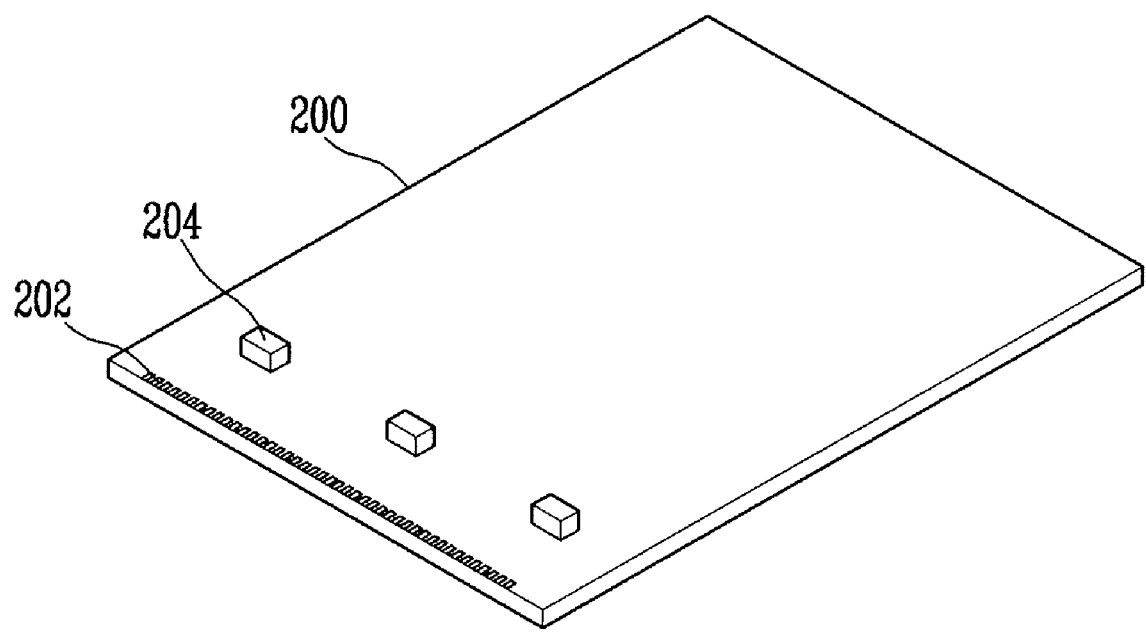
FIG. 3 is a schematic diagram showing a flexible printed circuit board according to an exemplary embodiment of the present invention.

FIG. 3 is a view showing a flexible printed circuit board (FPCB) according to an embodiment of the present invention.

Referring to FIG. 3, second pads 202 and circuit components are located on the flexible printed circuit board (FPCB) 200 in an exemplary embodiment of the present invention. The second pads 202 are electrically coupled with the first pads 105 to supply a drive signal (e.g., a predetermined drive signal) to the first pads 105. More specifically, the circuit components on the FPCB 200 generate a drive signal to be supplied to the second pads 202 and the housing 204.

At least one housing 204 containing a light emitting diode is located on the FPCB 200. The housing 204 is electrically coupled to the FPCB 200 for receiving a drive signal provided from the FPCB 200 to an LED inside the housing 204. In one exemplary embodiment, one side of the housing 204 is open to allow the transfer of light generated by the LED to the light guide plate 118.

Figure 4A:
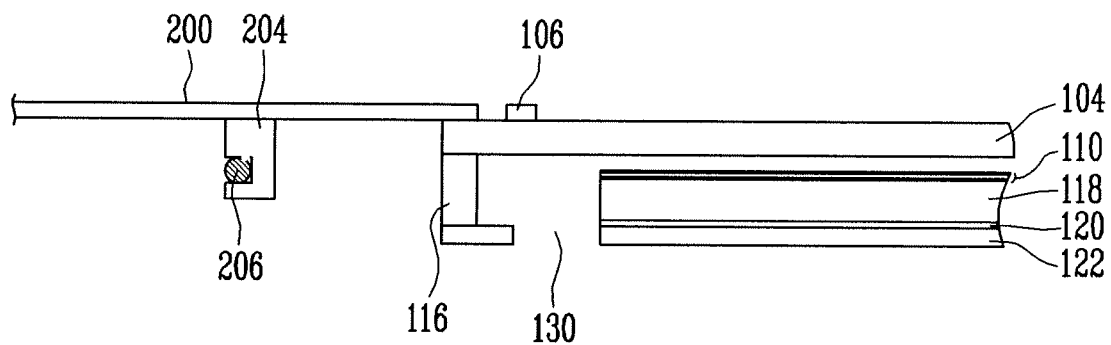
FIGS. 4A and 4B are schematic cross-sectional diagrams showing a coupling between a liquid crystal display device and a flexible printed circuit board according to an exemplary embodiment of the present invention.
Figure 4B:
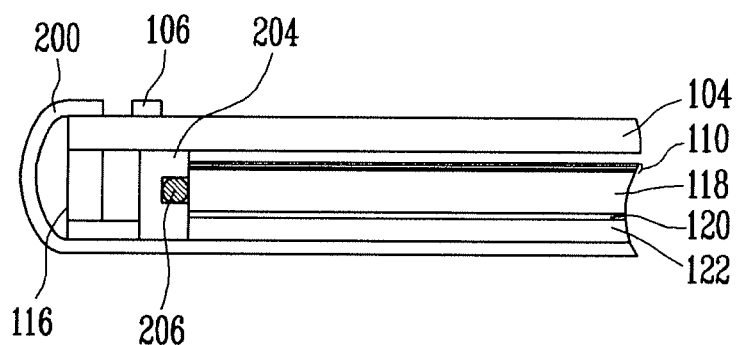
Figure 5:
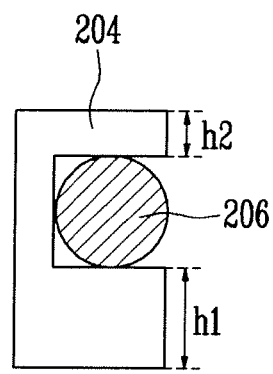
FIG. 5 is a detailed diagram of a housing of FIGS. 4A and 4B.

FIG. 4A and FIG. 4B are cross-sectional views showing a coupling between the liquid crystal display device and a flexible printed circuit board according to the present invention. FIG. 5 is a detailed view showing the fixing portion shown in FIG. 4A and FIG. 4B.

With reference to FIGS. 4A and 4B, the first pads 105 and the second pads 202 are electrically coupled together. The FPCB 200 is bent at an angle (e.g., a predetermined angle) and attached to the rear surface of the bottom chassis 122 and configured such that the housing 204 is inserted in the slit (or through the slit) 130. As such, the LED 206 is positioned adjacent an edge of the light guide plate 118. Accordingly, light generated by the light emitting diode 206 can be stably supplied to the light guide plate 118.

As shown in FIG. 5, a height h1 of a lower portion varies from a height h2 of an upper portion of the housing 204. For example, the height h1 of the lower portion of the housing 204 in contact with the FPCB 200 is configured for the LED 206 to be positioned adjacent an edge of the light guide plate 118. In one exemplary embodiment, the height h1 of the lower portion in the housing 204 is thicker than the height h2 of the upper portion in the housing 204 to take into account the bottom chassis 122 and to position the LED 204 at substantially a center of an edge of the light guide plate 118.

A thickness of the bottom chassis 122 is configured to provide relatively high strength to the liquid crystal display device 160. When the height h1 of a lower portion and the height h2 of an upper portion in the housing 204 are identical, the light emitting diode 206 may not be positioned at the center of an edge of the light guide plate 118, thereby deteriorating the efficiency of the light. Accordingly, the height h1 of the lower portion of the housing 204 is configured such that the light emitting diode 206 is positioned at substantially the center of an edge of the light guide plate 118, thereby improving the light efficiency. In other words, in accordance with aspects of the present invention, the housing 204 is configured such that the lower portion of the housing 204 is thicker than the upper portion of the housing 204.

As described earlier, in the present invention, since the fixing portion 204 is directly attached to the FPCB 200, manufacturing cost can be reduced as compared with the conventional liquid crystal display device. In addition, in the present invention, because the height h1 of a lower portion in the fixing portion 206 is set to be thicker than the height h2 of an upper portion therein, the light emitting diode 206 can be positioned at a central side of the light guide plate 118.

Figure 6:
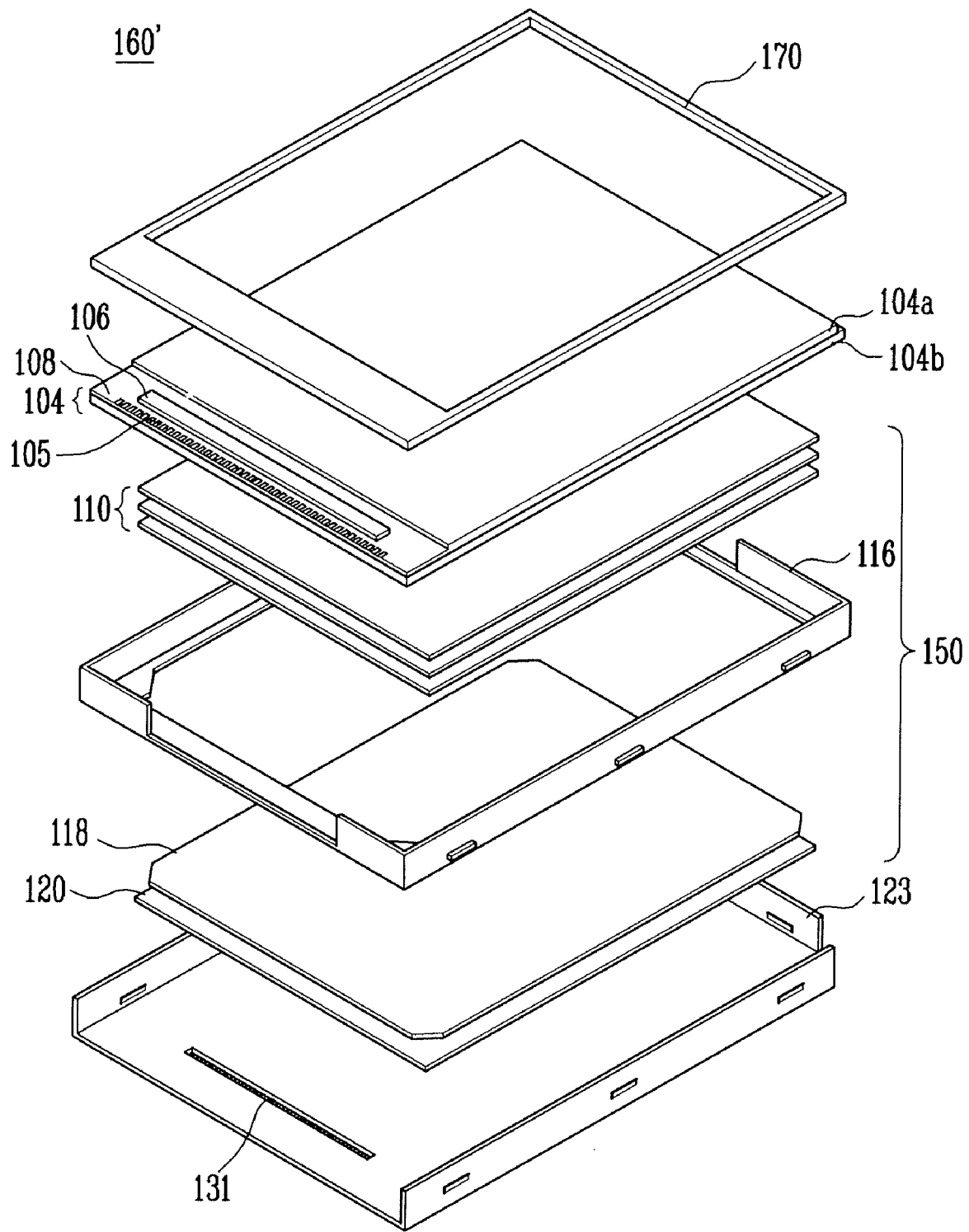
FIG. 6 is an exploded schematic diagram perspective showing a liquid crystal display device according to a second exemplary embodiment of the present invention.

FIG. 6 is a perspective view showing a liquid crystal display device according to a second embodiment of the present invention. Parts of FIG. 6 corresponding to those of FIG. 2 are designated by the same symbols and the description thereof is omitted.

With reference to FIG. 6, the liquid crystal display device according to a second exemplary embodiment of the present invention further includes a top chassis 170. The top chassis 170 is fixed to the mold frame 116, and provides additional strength to a liquid crystal display device 160'. Furthermore, a single slit 131 is located at a bottom chassis 123. A length of the slit 131 allows housings 204 on an FPCB 200 to be insertable into the slit 131.

As described earlier, since the housing 204 is directly attached to the FPCB 200, manufacturing costs can be reduced as compared to a conventional liquid crystal display device incorporating a light emitting diode substrate. Additionally, because the height h1 of a lower portion of the housing 204 is greater than the height h2 of an upper portion thereof, the light emitting diode 206 can be positioned at substantially a center of an edge of the light guide plate 118.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display device comprising:
    a liquid crystal display panel for displaying images, the liquid crystal display panel comprising a first pad;
    a light guide plate adjacent the liquid crystal display panel for providing light supplied to an edge of the light guide plate to the liquid crystal display panel;
    a bottom chassis having at least one slit thereon, the light guide plate being between the liquid crystal display panel and a first side of the bottom chassis;
    a flexible printed circuit board attached to the liquid crystal display panel and being on a second side of the bottom chassis and comprising a second pad coupled to the first pad;
    at least one housing directly attached to the flexible printed circuit board and extending through the at least one slit to be within the bottom chassis, the at least one housing supporting a light emitting diode for supplying the light to the light guide plate, wherein the light emitting diode is positioned at an edge of the light guide plate;
    wherein the housing comprises a first portion and a second portion on opposite sides of the light emitting diode, the first and second portions having different thicknesses from each other, and wherein the first portion is directly attached to the flexible printed circuit board.

2. The liquid crystal display device as claimed in claim 1, wherein the thickness of the first portion of the housing is greater than the thickness of the second portion of the housing.

3. The liquid crystal display device as claimed in claim 1, wherein the thickness of the second portion and the thickness of the first portion of the housing are configured to position the light emitting diode at substantially a center of the edge of the light guide plate.

4. The liquid crystal display device as claimed in claim 1, wherein the light guide plate does not overlap the at least one slit.

5. The liquid crystal display device as claimed in claim 1, wherein the flexible printed circuit board has at least two housings thereon, each housing being inserted through a separate one of at least two slits.

6. The liquid crystal display device as claimed in claim 1, wherein the flexible printed circuit board has at least two housings thereon, wherein the at least two housings are inserted through a single slit of the at least one slit.

7. The liquid crystal display device as claimed in claim 1, further comprising:
    a reflection plate between the bottom chassis and the light guide plate;
    optical sheets between the light guide plate and the liquid crystal display panel;
    wherein the mold frame fixes together the light guide plate, the reflection plate, and the optical sheets.

8. The liquid crystal display device as claimed in claim 7, further comprising a top chassis on the liquid crystal display panel and coupled to the mold frame.

* * * * *